(12) United States Patent
Mi et al.

(10) Patent No.: US 8,077,449 B2
(45) Date of Patent: Dec. 13, 2011

(54) MOUNTING APPARATUS FOR COMPUTER CASE

(75) Inventors: Qing-Hui Mi, Shenzhen (CN); Guang-Yao Lee, Taipei Hsien (TW); Hsuan-Tsung Chen, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 145 days.

(21) Appl. No.: 12/750,674

(22) Filed: Mar. 30, 2010

(65) Prior Publication Data

US 2011/0157805 A1 Jun. 30, 2011

(30) Foreign Application Priority Data

Dec. 28, 2009 (CN) .......................... 2009 1 0312374

(51) Int. Cl.
*G06F 1/16* (2006.01)
(52) U.S. Cl. ................... 361/679.21; 206/710; 248/121; 292/216
(58) Field of Classification Search ................ 206/545, 206/710, 521; 439/532, 76.1; 160/23, 197, 160/184; 248/442.2, 205.1, 121, 178.1; 312/223.1, 312/223.2, 328, 333; 361/679.43, 679.34, 361/679.58, 679.33, 679.31, 679.55, 679.27; 292/162, 216, 196, 36
See application file for complete search history.

(56) References Cited

U.S. PATENT DOCUMENTS

| 7,407,202 B2* | 8/2008 | Ye et al. ..................... 292/251.5 |
| 7,646,599 B2* | 1/2010 | Zhang et al. ............. 361/679.43 |
| 2011/0156549 A1* | 6/2011 | Zhang et al. ............... 312/223.1 |

* cited by examiner

*Primary Examiner* — Hung Duong
(74) *Attorney, Agent, or Firm* — Altis Law Group, Inc.

(57) ABSTRACT

A mounting apparatus is provided for fixing a computer case to a liquid crystal display (LCD) monitor. The mounting apparatus includes a supporting bracket attached to a backside of the LCD monitor, and a latch mechanism movably mounted to the supporting bracket. The latch mechanism includes a locking member slidably engaging with the supporting bracket, and a driving member slidably engaging with the supporting bracket. The locking member may slides to a locking position to hold the computer case to the supporting bracket. The driving member is capable of being slid in a direction to push the locking member to an unlocking position, where the computer case is ready for being released from the supporting bracket.

18 Claims, 8 Drawing Sheets

MOUNTING APPARATUS FOR COMPUTER CASE

BACKGROUND

1. Technical Field

The present disclosure relates to mounting apparatuses and, more particularly, to a mounting apparatus for mounting a computer case to a liquid crystal display (LCD) monitor or the like.

2. Description of the Related Art

A desktop computer generally includes a monitor and a computer case. Nowadays, most people choose an LCD monitor over a conventional cathode ray tube monitor for their computer. The computer case typically arranges beside a computer desk or on the ground under the computer desk. However, a significant space is occupied by the computer case.

DETAILED DESCRIPTION

Figure 1:
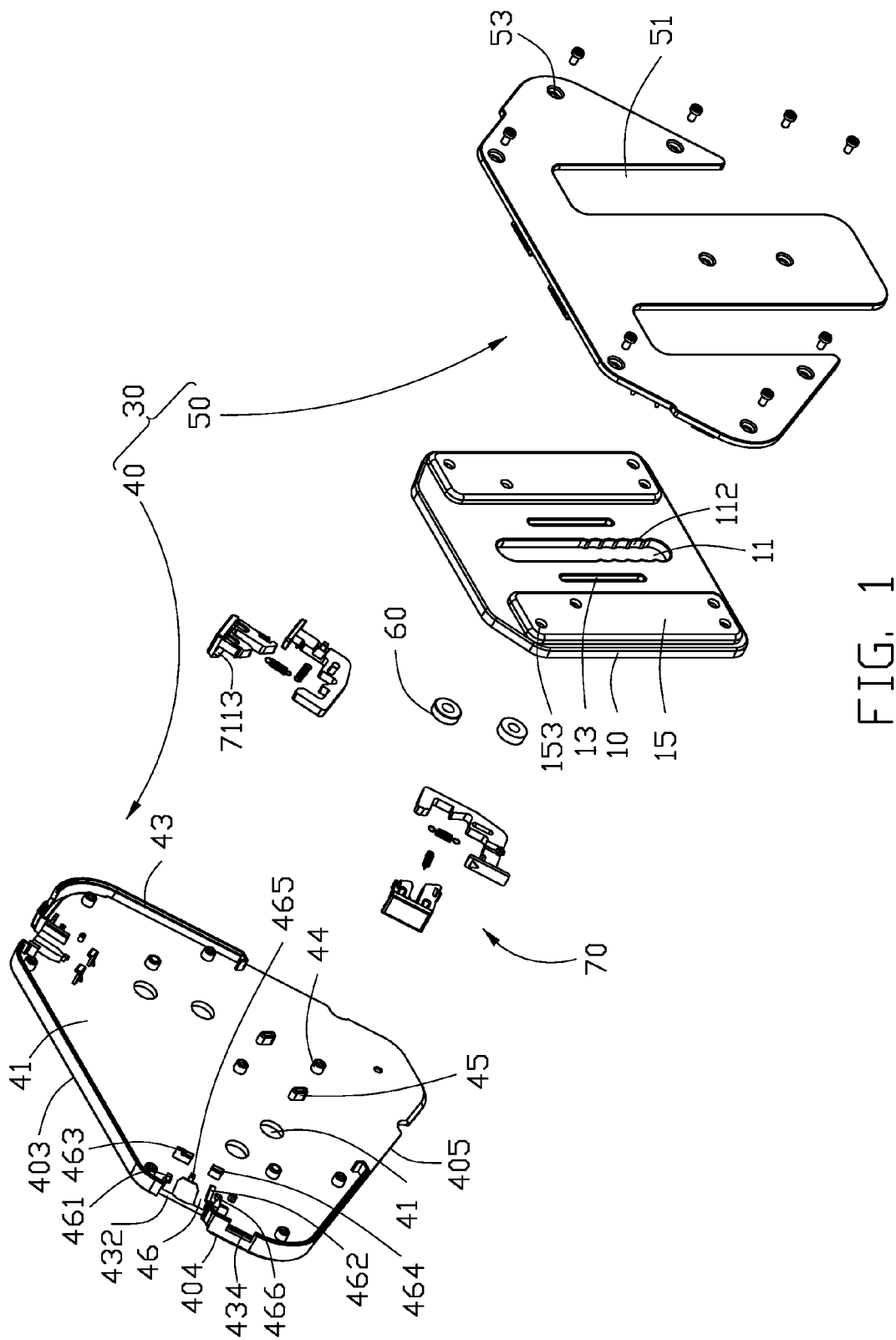
FIG. 1 is an exploded, isometric view of an embodiment of a mounting apparatus for a computer case.
Figure 8:
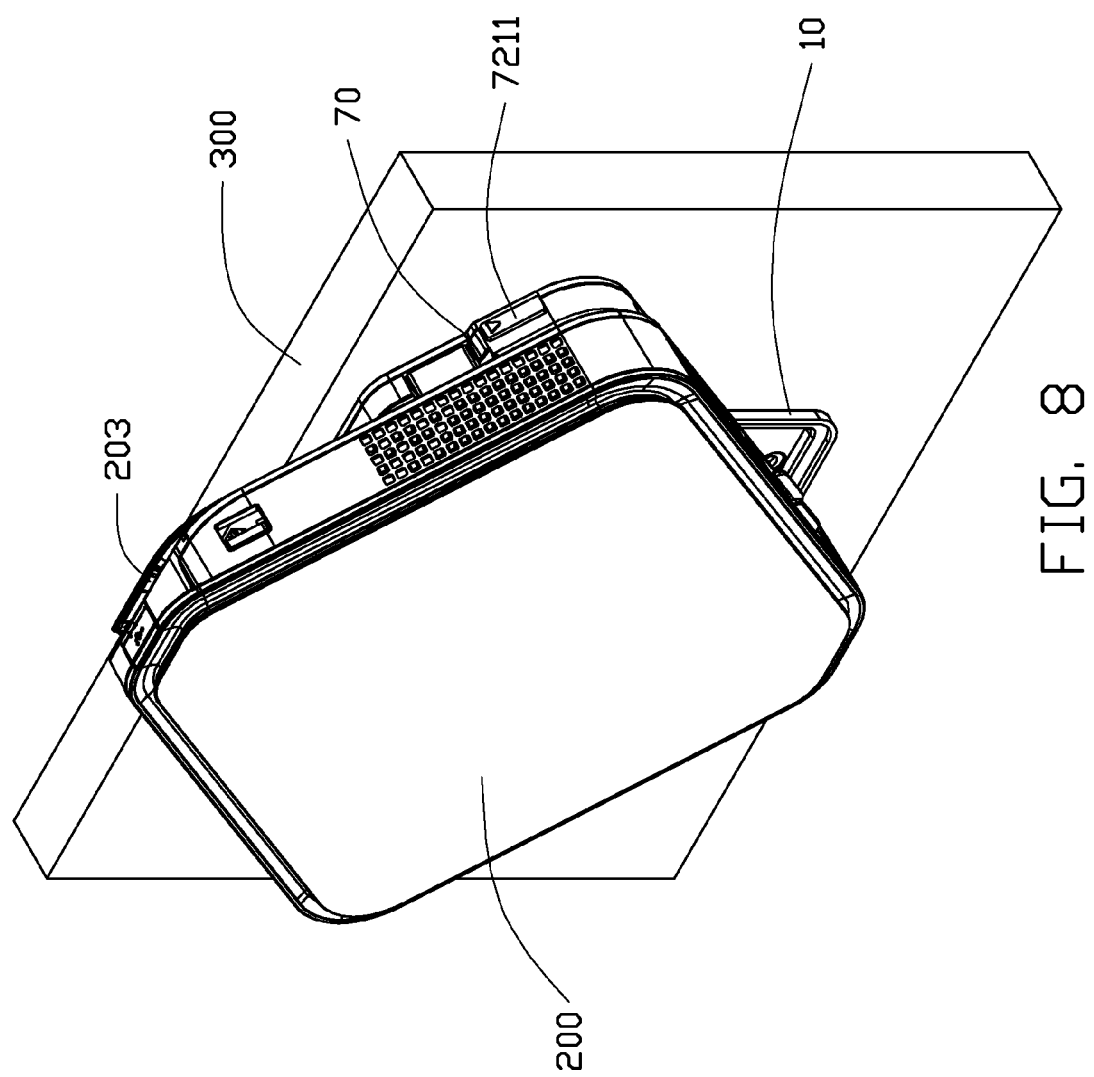
FIG. 8 shows the computer case of FIG. 6 mounted to the LCD monitor of FIG. 7.

Referring to FIGS. 1 and 8, an embodiment of a mounting apparatus is provided to mount a computer case 200 to a backside of a liquid crystal display (LCD) monitor 300. The LCD monitor 300 defines a plurality of wall-mount holes in compliance with the standard of the Video Electronics Standards Association (VESA). The mounting apparatus includes a fixing plate 10, a supporting bracket 30, two locating members 60, and two latch mechanisms 70. The computer case 200 is generally rectangular, with two retaining grooves 201 (shown in FIG. 6) respectively defined in two neighboring sides.

The fixing plate 10 is rectangular. The fixing plate 10 defines a sliding slot 11 and two alignment slots 13, and forms two rectangular protruding portions 15. The sliding slot 11 is parallel to two opposite sides of the fixing plate 10 and along a central line between the opposite sides. A plurality of teeth 112 is formed on opposite side walls bounding the sliding slot 1. The two alignment slots 13 are parallel to the sliding slot 11, and symmetrically arranged at opposite sides of the sliding slot 11. The two protruding portions 15 are symmetrically arranged at opposite sides of the alignment slots 13. A plurality of fixing holes 153 in compliance with the VESA standard is defined in the protruding portions 15.

Referring to FIGS. 1, and 4-7, the supporting bracket 30 includes a front cover 40 and a rear cover 50. In one embodiment, the front cover 40 includes a pentagonal front wall 41, a plurality of locating flanges 42 perpendicularly extending frontwards from a conjunction of adjacent sides of the front wall 41, and an enclosing wall 43 perpendicularly extending rearwards from corresponding sides of the front wall 41. A plurality of through holes 411 is defined in the front wall 41. A plurality of axially threaded mounting posts 44, and two locating tabs 45 extend from a rear side of the front wall 41. The front wall 41 includes a top side 403, two opposite upper lateral sides 404, and two opposite lower lateral sides 405. The plurality of locating flanges 42 correspondingly extends from a conjunction between the lower lateral sides 405, and each lower lateral side 405 and a corresponding upper lateral side 404. The enclosing wall 43 extends from the top side 403, lower portions of the upper lateral sides 404, and upper portions of the lower lateral sides 405 of the front wall 41. Two receiving areas 46 are defined in the front cover 40, correspondingly adjacent to the two upper lateral sides 404 of the front wall 41. Each of the receiving areas 46 is bounded by blocking portions 461, 462, 463 and 464 extending from the front wall 41 adjacent to an upper portion of each upper lateral side 404, and the enclosing wall 43. A first engagement tab 465 and a second engagement tab 466 are arranged at each of the receiving areas 46. The enclosing wall 43 defines a first opening 432 at the upper portion of each upper lateral side 404, and a second opening 434 at the lower portion of each upper lateral side 404. The rear cover 50 is substantially pentagonal, and defines two parallel rectangular guiding slots 51, and a plurality of securing holes 53.

The locating members 60 are made of material with high friction coefficient. In one embodiment, the locating members 60 are rubber wheels.

Figure 2:
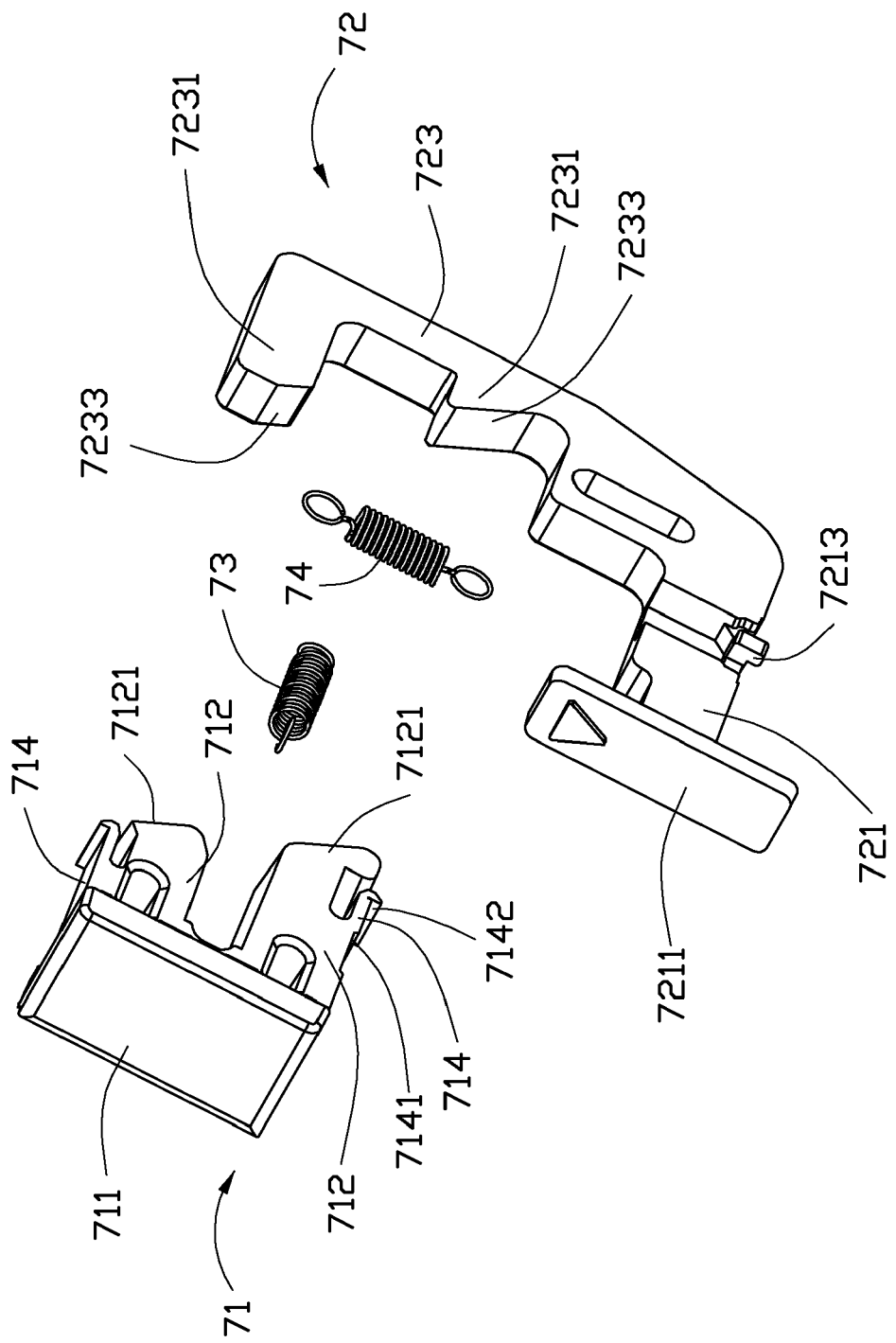
FIG. 2 is an exploded, isometric view of one of the two latch mechanisms of FIG. 1.
Figure 3:
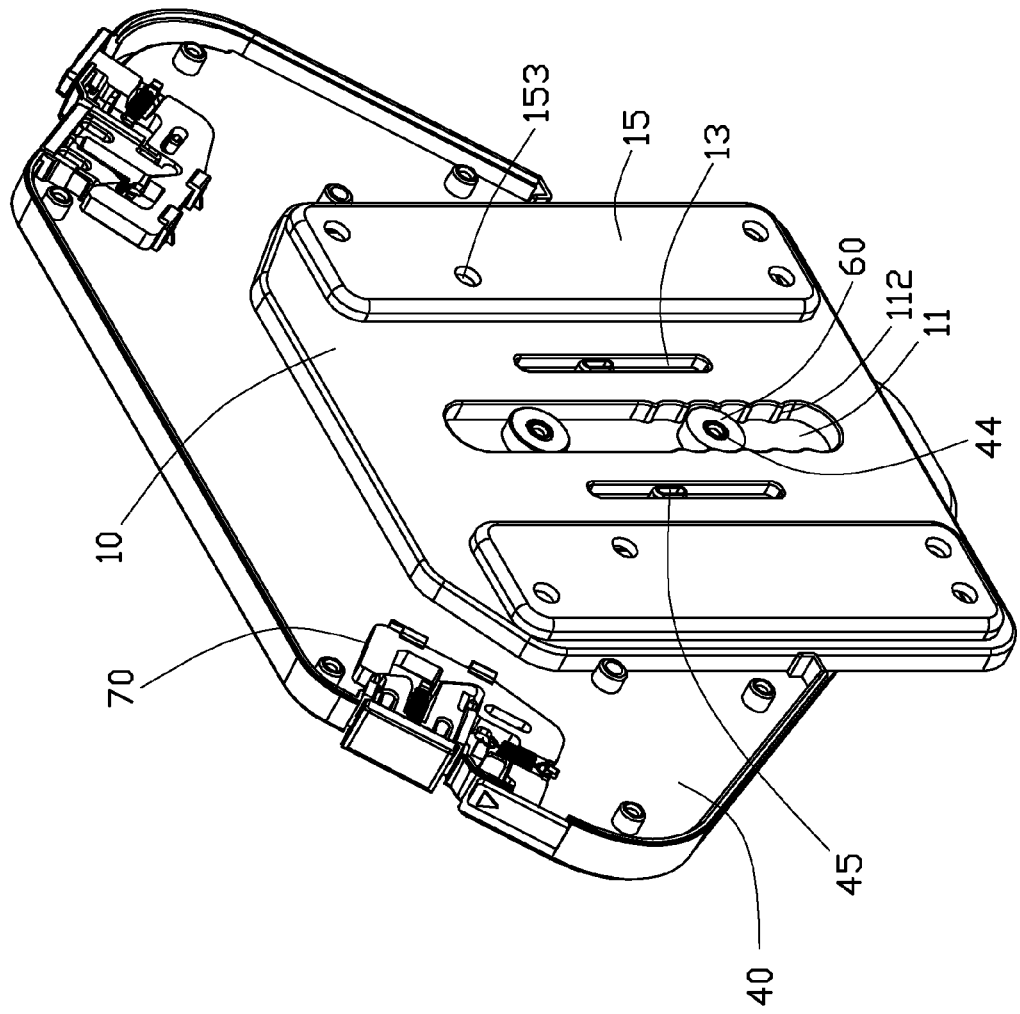
FIG. 3 is an assembled, isometric view of a front cover, the latch mechanisms, and a fixing plate of FIG. 1.
Figure 4:
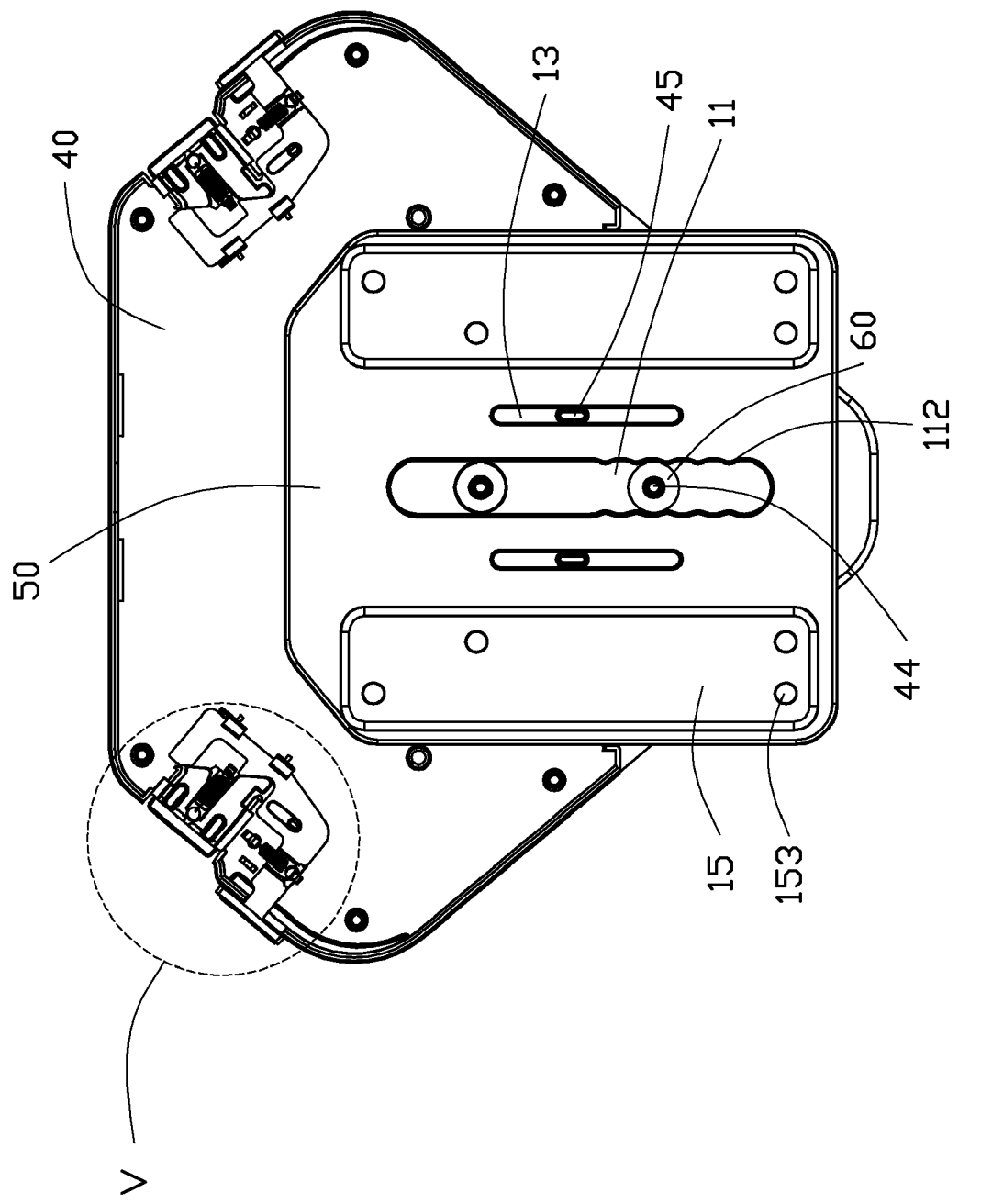
FIG. 4 is a front plan view of FIG. 3.
Figure 5:
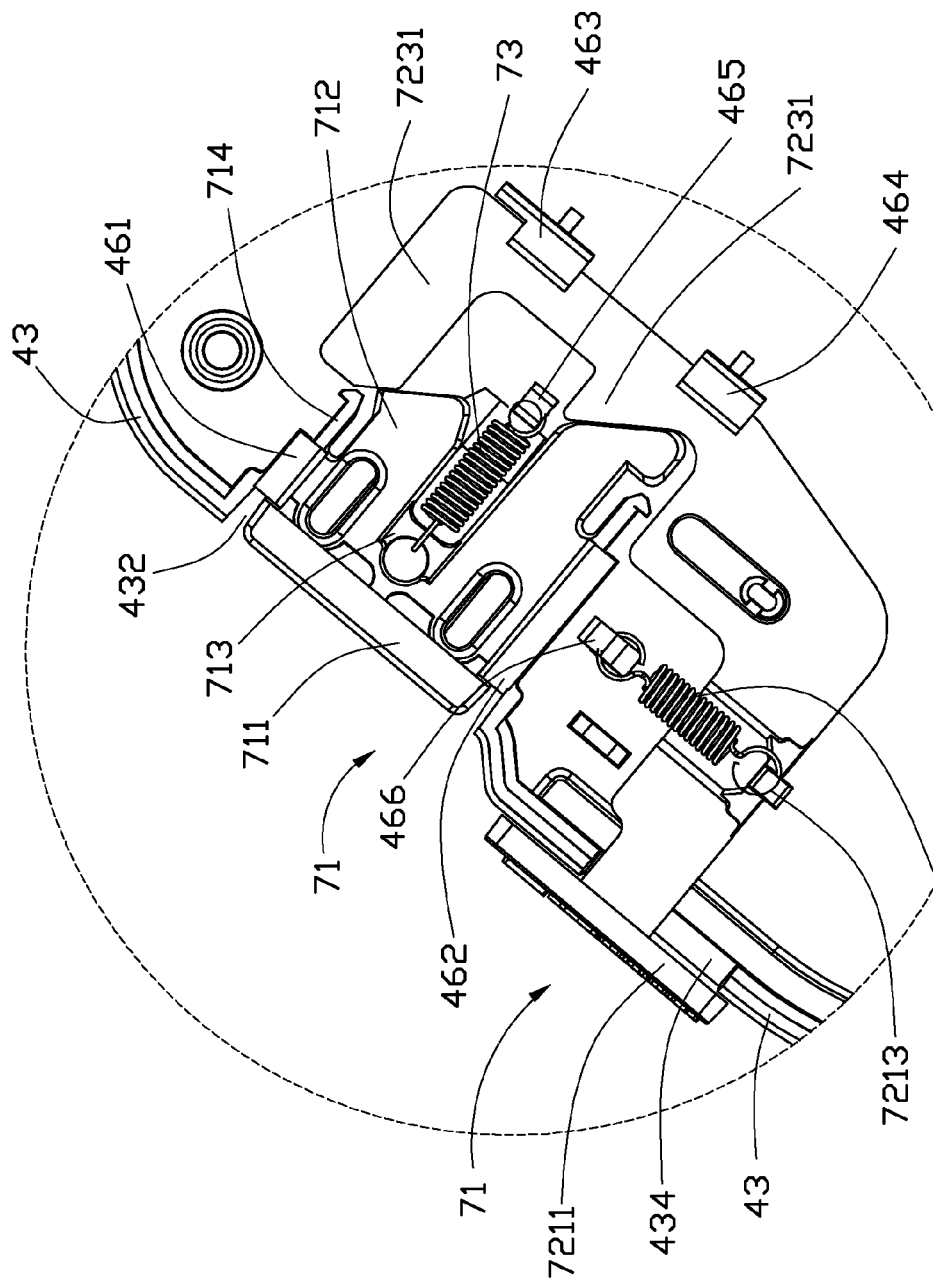
FIG. 5 is an enlarged view of an encircled portion V of FIG. 4.

Referring to FIGS. 1, 2, and 5, each of the latch mechanisms 70 includes a locking member 71, a driving member 72, a first resilient member 73, and a second resilient member 74. The locking member 71 includes a retaining portion 711, two spaced abutment portions 712 extending from an inner surface of the retaining portion 711, an engagement portion 713 extending from the inner surface of the retaining portion 711 between the two abutment portions 712 (Shown in FIG. 5). A locking tongue 7113 (shown in FIG. 1) protrudes from a side of the retaining portion 711. Each abutment portions 712 forms a resilient arm 714 on a side of the abutment portion 712 opposite to the other abutment portion 712. A distal end of each of the abutment portions 712 forms a slanted surface 7121. Each of the resilient arms 714 forms a shoulder 7141 adjacent to the retaining portion 711, and an anti-release hook 7142 at a distal end of the resilient arm 714. The driving member 72 includes an elongated first arm 721, and an elongated second arm 723 perpendicularly extending from a first end of the first arm 721. A manipulating portion 7211 forms at a second end of the first arm 721 opposite to the second arm 723. An engagement portion 7213 forms on the first arm 721 adjacent to the second arm 723. Two driving portions 7231 perpendicularly extend from the middle and distal end of the second arm 723, respectively. A distal end of each of the driving portions 7231 forms a slanted surface 7233. In one embodiment, the first resilient member 73 and the second resilient member 74 are coil springs, each including two hooks at opposite ends.

Referring to FIGS. 1-3, 5, and 6, in assembly, each of the latch mechanisms 70 is installed to the front cover 40, in one of the receiving areas 46 in a way described as below. The locking member 71 is placed in one of the receiving areas 46, with the retaining portion 711 extending out of a corresponding first opening 432 of the enclosing wall 43. The blocking portions 461 and 462 are engaged with the shoulders 7141 of the corresponding resilient arms 714. Opposite hooks of the first resilient member 73 are respectively engaged with the engagement portion 713 of the locking member 71 and the first engagement tab 465 of the front cover 40 respectively. The driving member 72 is placed in one of the receiving areas 46, with the second arm 723 extending through a corresponding second opening 434 of the enclosing wall 43 exposing the manipulating portion 7211. The blocking portions 463 and 464 of the front cover 40 abut against a side of the second arm 723 opposite to the driving portions 7231. The slanted surfaces 7233 of the two driving portions 7231 abut against the slanted surfaces 7121 of corresponding abutment portions 712 of the locking member 71. Opposite hooks of the second resilient member 74 are respectively engaged with the engagement portion 7213 of the driving member 72 and the second engagement tab 466 of front cover 40 respectively.

The two locating members 60 are correspondingly fitted about two of the plurality of mounting posts 44 arranged along a central line of the front cover 40. The fixing plate 10 is attached to the rear side of the front cover 40. The locating members 60 are received in the sliding slot 11 of the fixing plate 10, and the locating tabs 45 are retained in the corresponding alignment slots 13 of the fixing plate 10.

The rear cover 50 is attached to the front cover 40, with the protruding portions 15 of the fixing plate 10 engaged in the corresponding guiding slots 51 of the rear cover 50, and the plurality of mounting posts 44 of the front cover 40 correspondingly aligned with the plurality of securing holes 53 of the rear cover 50. The rear cover 50 is secured to the front cover 40 with a plurality of screws correspondingly extending through the plurality of securing holes 53 and engaged in the plurality of mounting posts 44. Therefore, the fixing plate 10 is sandwiched between the front cover 40 and the rear cover 50.

Figure 6:
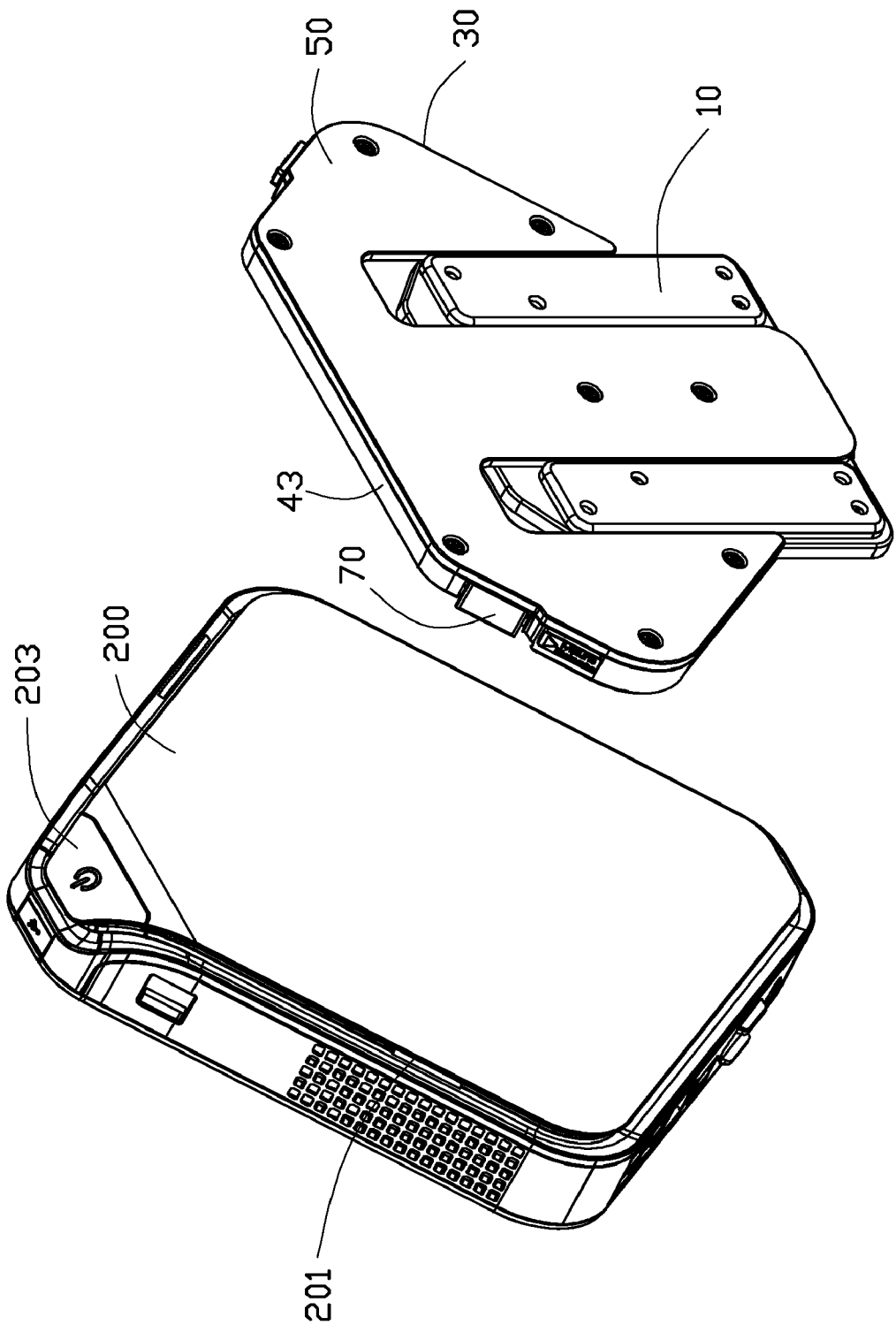
FIG. 6 shows the mounting apparatus of FIG. 1 in an assembled state, and a computer case released from the mounting apparatus.
Figure 7:
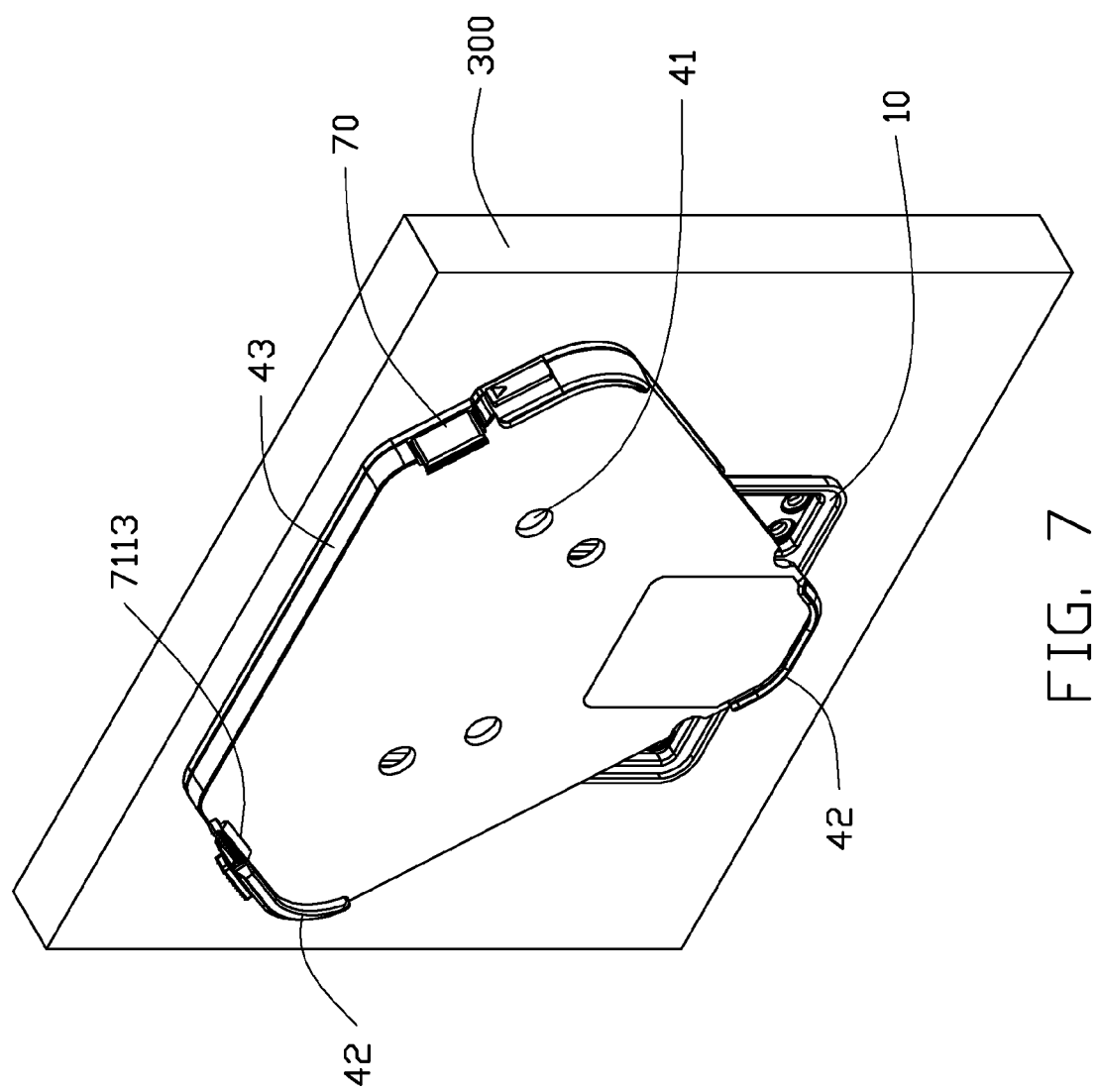
FIG. 7 is an assembled, isometric view of the mounting apparatus of FIG. 6 and a liquid crystal display (LCD) monitor.

Referring to FIGS. 6-8, before mounting the computer case 200 to the backside of the LCD monitor 300. The fixing plate 10 slides relative to the supporting bracket 30, with the locating members 60 sliding in the sliding slot 11 of the fixing plate 10. The locating tabs 45 of the front cover 40 slide in the corresponding alignment slots 13 of the fixing plate 10, until the plurality of fixing holes 153 of the fixing plate 10 align with the plurality of through holes 411 of the front cover 40 correspondingly. A plurality of screws correspondingly passes through the plurality of through holes 411, extends through the plurality of fixing holes 153, and engage in the plurality of wall-mount holes of the LCD monitor 300. Therefore, the mounting apparatus is fixed to the backside of the LCD monitor 300, ready for mounting to the computer case 200.

To mount the computer case 200 to the LCD monitor 300, a lower corner of the computer case 200 is supported on the locating flange 42 between the lower lateral sides 405 of the front cover 40. The upper portion of the computer case 200 is moved towards the LCD monitor 300 urging the retaining portions 711 of the locking members 71 of the latch mechanisms 70, and pushes the locking members 71 to slide outwards via corresponding first openings 432 of the enclosing wall 43 of the front cover 40. With the sliding of the locking members 71, the resilient arms 714 of the locking members 70 deform to release the blocking portions 461 and 462 from the shoulders 7141 of the resilient arms 714. The first resilient members 73 also deform. When a front side of the computer case 200 abuts against the front wall 41 of the front cover 40, the locking tongues 7113 of the locking members 71 align with the corresponding retaining grooves 201 of the computer case 200. Therefore, the first resilient members 73 restore to drive the corresponding locking members 71 to slide back, until the locking tongues 7113 engage in the corresponding retaining grooves 201 of the computer case 200. Therefore, the computer case 200 is mounted to the LCD monitor 300 via the mounting apparatus, with opposite side corners of the computer case 200 supported by the corresponding locating flanges 42 between the upper and lower lateral sides 404 and 405. Since the supporting bracket 30 is slidable up and down relative to the fixing plate 10, and positioned at a predetermined height with the locating members 60 meshing with the teeth 112 of the sliding slot 11 The computer case 200 can be adjusted to make sure a button 203 adjacent to a top of the computer case 200 is accessible to a user at the front of the LCD monitor 300.

To detach the computer case 200 from the LCD monitor 300, the manipulating portions 7211 of the driving members 72 are operated to make the driving members 72 slide along the enclosing wall 43 of the front cover 40 away from the corresponding locking members 71. With the sliding of the driving members 72, the slanted surfaces 7233 of the driving portions 7231 of the driving members 72 slide on the slanted surfaces 7121 of the corresponding abutment portions 712 of the locking members 71. Therefore, the locking members 71 are urged away from the supporting bracket 30 to make the locking tongues 7113 of the locking members 71 disengage from the corresponding retaining grooves 201 of the computer case 200. Therefore, the computer case 200 is ready to be detached from the mounting apparatus. When the anti-release hooks 7142 of the resilient arms 714 abut against the corresponding blocking portions 461 and 462, the locking members 71 are prevented from sliding outwards and disengaging from the supporting bracket 30.

In another embodiment, the fixing plate 10 is unnecessary, and the supporting bracket 30 may be directly fixed to a wall or other flat surface of an object. Therefore, the computer case 200 is mounted to the wall or an object, with the computer case 200 received in the supporting bracket 30 and held by one or more latch mechanism 70 installed to the supporting bracket 30.

It is believed that the present embodiments and their advantages will be understood from the foregoing description, and it will be apparent that various changes may be made thereto without departing from the spirit and scope of the description or sacrificing all of its material advantages, the examples hereinbefore described merely being exemplary embodiments.

What is claimed is:

1. A mounting apparatus for a computer case, the mounting apparatus comprising:
   a supporting bracket mounted to a flat surface to support the computer case; and
   a latch mechanism installed to the supporting bracket, the latch mechanism comprising:
   a locking member slidably mounted to the supporting bracket and operable to be between a locking position to retain the computer case to the supporting bracket, and an unlocking position to enable the computer case to be released from the supporting bracket;
   a first resilient member connected between the locking member and the supporting bracket, and providing a restoring force to drive the locking member towards the locking position;
   a driving member slidably mounted to the supporting bracket, wherein the locking member is urged towards the unlocking position by the driving member in response to the driving member sliding along a first direction; and
   a second resilient member connected between the driving member and the supporting bracket, and providing a restoring force to drive the driving member to slide in a second direction opposite to the first direction.

2. The mounting apparatus of claim 1, wherein the locking member comprises a retaining portion to engage with the computer case, and an abutment portion extending from the retaining portion, the driving member comprises a manipulating portion extending out of the supporting bracket, and a driving portion abutting against the abutment portion of the locking member.

3. The mounting apparatus of claim 2, wherein a locking tongue extends from the retaining portion to engage in a retaining groove defined in the computer case.

4. The mounting apparatus of claim 2, wherein the abutment portion of the locking member and the driving portion of the driving member respectively form a slanted surface, the slanted surface of the driving portion matches and interacts on the slanted surface of the abutment portion in response to the driving member sliding along the first direction.

5. The mounting apparatus of claim 1, further comprising a fixing plate fixed to the flat surface, wherein the supporting bracket is slidably coupled to the fixing plate.

6. The mounting apparatus of claim 5, wherein the supporting bracket comprises a front cover and a rear cover engaged with each other, and the fixing plate is sandwiched between the front cover and the rear cover.

7. The mounting apparatus of claim 6, wherein at least one locating member attached to the front cover of the supporting bracket, the fixing plate defines a sliding slot receiving said at least one locating member, a plurality of teeth is formed on opposite side walls bounding the sliding slot, said at least one locating member engages with the teeth of the sliding slot to position said at least one locating member at a predetermined position of the sliding slot.

8. The mounting apparatus of claim 7, wherein said at least one locating member comprises two rubber wheels.

9. The mounting apparatus of claim 5, wherein the supporting bracket further comprises a plurality of locating flanges extending from the front cover to abut against and support the computer case.

10. The mounting apparatus of claim 1, wherein the first resilient member and the second resilient member are two coil springs, each comprising two hooks at opposite ends, the supporting bracket comprises a first engagement tab and a second engagement tab, the hooks of the first resilient member correspondingly engage with the first engagement tab and the locking member of the latch mechanism, and the hooks of the second resilient member correspondingly engage with the second engagement tab and the driving member of the latch mechanism.

11. The computer system comprising:
a liquid crystal display (LCD) monitor;
a mounting apparatus comprising:
  a supporting bracket mounted to a backside of the LCD monitor; and
  a latch mechanism installed to the supporting bracket; and
a computer case supported on the supporting bracket and retained by the latch mechanism;
wherein the latch mechanism comprises:
  a locking member slidably mounted to the supporting bracket and operable to be between a locking position to retain the computer case to the supporting bracket, and an unlocking position to enable the computer case to be released from the supporting bracket;
  a first resilient member connected between the locking member and the supporting bracket, and providing a restoring force to drive the locking member towards the locking position;
  a driving member slidably mounted to the supporting bracket, the locking member is urged towards the unlocking position by the driving member in response to the driving member sliding along a first direction; and
  a second resilient member connected between the driving member and the supporting bracket, and providing a restoring force to drive the driving member to slide in a second direction opposite to the first direction.

12. The computer system of claim 11, wherein the mounting apparatus further comprises a fixing plated fixed to the backside of the LCD monitor, the supporting bracket is slidably coupled to the fixing plate.

13. The computer system of claim 12, wherein the fixing plate defines a plurality of fixing holes in compliance with the VESA (Video Electronics Standards Association) standard.

14. The computer system of claim 12, wherein the supporting bracket comprises a front cover and a rear cover engaged with each other, and the fixing plate is sandwiched between the front cover and the rear cover.

15. The computer system of claim 14, wherein the supporting bracket further comprises a plurality of locating flanges extending from the front cover to abut against and support the computer case.

16. The computer system of claim 14, wherein at least one locating member attached to the front cover of the supporting bracket, the fixing plate defines a sliding slot receiving said at least one locating member, a plurality of teeth is formed on opposite side walls bounding the sliding slot, said at least one locating member engages with the teeth of the sliding slot to position said at least one locating member at a predetermined position of the sliding slot.

17. The computer system of claim 16, wherein said at least one locating member comprises two rubber wheels.

18. The mounting apparatus of claim 17, wherein the first resilient member and the second resilient member are two coil springs, each comprising two hooks at opposite ends, the supporting bracket comprises a first engagement tab and a second engagement tab, the hooks of the first resilient member correspondingly engage with the first engagement tab and the locking member of the latch mechanism, and the hooks of the second resilient member correspondingly engage with the second engagement tab and the driving member of the latch mechanism.

* * * * *